UNITED STATES PATENT OFFICE.

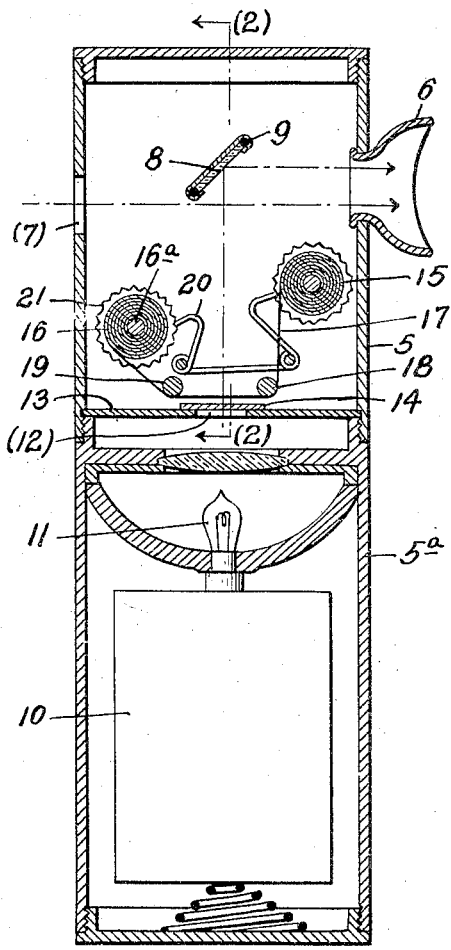
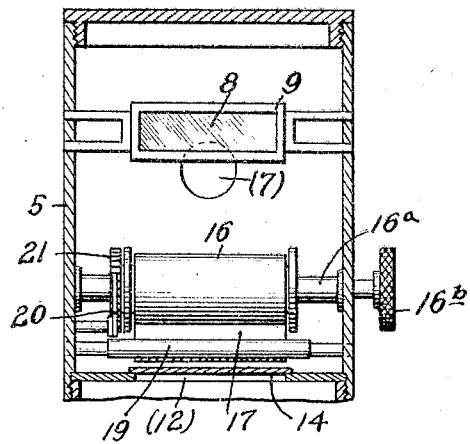
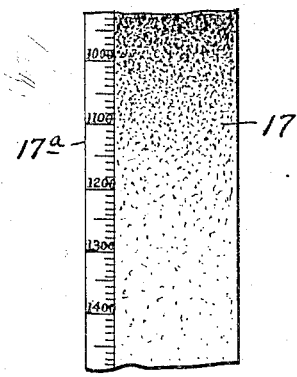
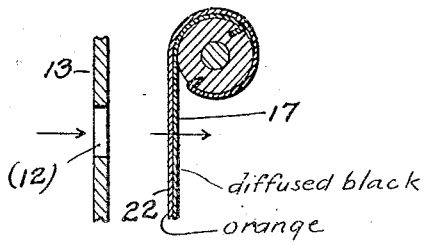

JOSEPH W. WEITZENKORN, OF PITTSBURGH, PENNSYLVANIA, ASSIGNOR TO GIBB INSTRUMENT COMPANY, OF PITTSBURGH, PENNSYLVANIA, A CORPORATION OF PENNSYLVANIA.

PYROMETER.

1,209,915.  Specification of Letters Patent.  Patented Dec. 26, 1916.

Application filed March 24, 1916. Serial No. 86,505.

*To all whom it may concern:*

Be it known that I, JOSEPH W. WEITZENKORN, a citizen of the United States, residing at Pittsburgh, in the State of Pennsylvania, have invented certain new and useful Improvements in Pyrometers, of which the following is a specification.

My invention relates to means for optical measurement or estimation of the temperature of heated bodies; its primary object is to produce a convenient, accurate, reliable and cheap, direct vision pyrometer.

Other objects are to provide for standardizing the comparison color and the illuminating thereof; to provide a flexible degree of change of color; to provide a direct temperature reading instrument, and to generally improve the construction and operation of such instruments.

The invention is illustrated in a preferred form in the accompanying drawing in which,—

Figure 1 is a vertical central section of the complete instrument; Fig. 2 is a partial longitudinal section, at right angles to that of Fig. 1, and on the line (2) in the latter figure, but omitting the battery; Fig. 3 is a fragmentary enlarged view of one of the color scale tapes; Fig. 4 is a sketch showing a modified manner of arranging the color tapes.

Optical pyrometers have been built on the principle of comparing a colored object with the specimen under observation by superposing it in the line of vision and changing the color of the comparison object until it disappears against the background of the observed object; others are made by placing in juxtaposition a standardized colored object and the article to be observed, and changing the light on the standard or comparison object. But in all these there has been difficulty in securing a standard color for comparison; it has been difficult to repeat observations in a uniform manner, and the apparatus has been more or less complex and untrustworthy.

In my invention I make a direct comparison between the color of the metal under observation and the apparent color of a particular part of a movable tape or other translucent article standardized and graduated in such a way that each position on it always corresponds to a definite temperature, and I provide this with a scale in such a manner that temperature may be directly read off at the time of the observation.

Thus, in the simplified form of the device as shown in the accompanying drawing, I show a metal tube 5 having an eye-piece 6 arranged for direct vision through an opposite hole (7) upon a metal being examined, and in this tube I mount an inclined mirror 8 in any convenient form of support 9, and throw upon this mirror a standardized, but changeable, colored light. This is conveniently done by adding a supplemental tube 5ª which contains a battery 10, and electric light 11, placed in front of the opening (12) of an opaque diaphragm 13 over which I may mount a thin disk or film 14 of translucent standard orange color. Within the tube 5 on a pair of rolls 15 and 16 I mount a traveling tape 17 passing over two guide rods 18 and 19 so that a flat portion of the tape stands in front of and close to the translucent diaphragm 14. The rolls 15 and 16 may be held in place by any convenient form of spring 20 engaging the milled peripheries of a flange 21 of the roll. The shaft of each roll (16ª) projects through the side of the tube 5 and is provided with a milled head 16ᵇ for turning it to move the tape 17. This tape, as better shown in Fig. 3, may be made of such material as celluloid and clouded in graduated form from a practically transparent condition at one end to a practically opaque condition at the other as indicated, and at the side of the tape there is a scale 17 showing the temperature corresponding to all particular positions when this black cloud is superposed on the orange color of the disk 14. It will be seen therefore that the light from the lamp 11 after passing through the orange disk 14 and the black clouded translucent tape 17 will fall upon the mirror 8 and be reflected out the eyepiece 6 in a line parallel with the line of vision to the object being observed through the opening (7). We have therefore a direct comparison between the object being observed and the standard color, and can move the tape 14 to bring them to identical appearance, whereupon the temperature is read directly on the scale 17. Otherwise I may employ any other combination of two translucent films, as by combining two celluloid tapes as shown in Fig. 4. One of these tapes may be a standard black cloud and the other a varying orange, or one may be a standard orange and the other a varying cloud, or one a standard yellow and the other a varying red etc., all as will be obvious to those familiar with the art.

I have found numerous advantages in the employment of two screens of which one is a cloud of diffused black, and the other a standard yellow which can be indefinitely reproduced without variation of color, and the transmitted light of which may be conveniently measured when desired. That is to say, the variables for controlling the color of the orange light is a mechanical mixture, and may therefore be better standardized. This has the additional advantage that the shifting of colors may be easily and conveniently made with any desired fineness of graduation.

Of course it will be understood that I am not limited to any particular material for the comparison color; the tape may be a fabric of any kind, and it need not be necessarily translucent, but may be lighted by reflection in obvious ways.

Fundamentally, the principal advantages of my device flow from the use of a standard but changeable color device, such as a film, and for making up this film by the combining of a movable clouded part and a uniform and fixed part, as well as from the compactness, convenience, and simplicity of the mechanical construction.

Having thus described my invention and illustrated its use, what I claim is the following:

1. In a pyrometer, a comparison color device composed of two superposed translucent bodies of which one has a fixed standard color and the other is of graduated color.

2. In an optical pyrometer a source of comparison colored light consisting of a source of white light, a fixed film of translucent orange and a movable film of diffused black cloud of varying intensity superposed on the orange film.

3. In an optical pyrometer, as a source of comparison colored light, comprising a lamp and two superposed translucent films of which one is a standard color and the other a changeable cloud combining with the first to give the color of heated metal at various definite temperatures.

In testimony whereof I have hereunto signed my name.

JOSEPH W. WEITZENKORN.